(12) United States Patent
Hershkovitz et al.

(10) Patent No.: US 9,117,023 B2
(45) Date of Patent: *Aug. 25, 2015

(54) DYNAMIC GENERATION OF TEST SEGMENTS

(71) Applicant: International Business Machines Corporation, Armonk, NY (US)

(72) Inventors: Oz Dov Hershkovitz, Haifa, IL (US); Yoav Avraham Katz, Haifa, IL (US)

(73) Assignee: International Business Machines Corporation, Armonk, NY (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/887,376

(22) Filed: May 6, 2013

(65) Prior Publication Data

US 2013/0311164 A1 Nov. 21, 2013

Related U.S. Application Data

(63) Continuation-in-part of application No. 12/626,901, filed on Nov. 29, 2009, now Pat. No. 8,438,000.

(51) Int. Cl.
*G06F 17/50* (2006.01)
*G06F 9/45* (2006.01)
*G06F 9/455* (2006.01)
*G06F 11/36* (2006.01)

(52) U.S. Cl.
CPC ........ *G06F 11/3652* (2013.01); *G06F 11/3684* (2013.01)

(58) Field of Classification Search
None
See application file for complete search history.

(56) References Cited

U.S. PATENT DOCUMENTS

| | | | | |
|---|---|---|---|---|
| 5,539,652 A | * | 7/1996 | Tegethoff | 703/14 |
| 5,729,554 A | | 3/1998 | Weir et al. | |
| 6,112,312 A | * | 8/2000 | Parker et al. | 714/32 |
| 6,226,716 B1 | * | 5/2001 | Bauman et al. | 711/145 |
| 7,085,964 B2 | | 8/2006 | Fournier et al. | |
| 7,290,174 B1 | | 10/2007 | Gray et al. | |
| 7,299,382 B2 | * | 11/2007 | Jorapur | 714/38.14 |
| 7,627,843 B2 | * | 12/2009 | Dozorets et al. | 716/106 |
| 2003/0188224 A1 | * | 10/2003 | Decker | 714/25 |
| 2005/0223346 A1 | | 10/2005 | Smith et al. | |

OTHER PUBLICATIONS

Hennenhoefer et al., "The evolution of Processor Test Generation Technology", Obsidian Software Inc., Published Aug. 2008, 8 pp.

(Continued)

*Primary Examiner* — Omar Fernandez Rivas
*Assistant Examiner* — Nithya J Moll (57) ABSTRACT

A computerized apparatus, method and computer product for generating tests. The apparatus comprises: a processor; an interface for obtaining a test template associated with a computerized system that comprises a template segment comprising instructions and directives or related control constructs; a test generator for generating a test associated with the template segment, comprising: a simulator for determining a state of the system associated with an execution of the test; a selector for selecting a template instruction or segment from the test template based on the state of the system; and a generator configured to generate a multiplicity of instructions based on system's state and on the selected template segment, wherein the test generator further comprises a verifier configured to verify that a previously generated instruction is in line with the current state of the system and with the selected template instruction or segment.

15 Claims, 3 Drawing Sheets

(56) References Cited

OTHER PUBLICATIONS

Behm et al., "Industrial experience with test generation languages for processor verification", DAC '04, Proceedings of the 41st annual Design Automation Conference, pp. 36-40, 2004/.

Chandra et al., "AVPGEN—A Test Generator for Architecture Verification", IEEE Transactions on VLSI Systems, vol. 3, Issue 2, pp. 188-200, Jun. 1995.

Zhang et al., "Using Model-Based Test Program Generator for Simulation Validation", ICESS'04: Proceedings of the First international conference on Embedded Software and Systems, pp. 549-556, Dec. 2004.

Bell et al., "Automatic Testcase Synthesis and Performance Model Validation for High-Performance PowerPC Processors", IEEE International Symposium on Performance Analysis of Systems and Software, pp. 154-165, 2006.

Li et al., "MA2TG: A Functional Test Program Generator for Microprocessor Verification", Proceedings of the 2005 8th Euromicro conference on Digital System Design (DSD'05), pp. 176-183, 2005.

Mishra et al., "Towards Automatic Validation of Dynamic Behavior in Pipelined Processor Specifications", Design Automation for Embedded Systems, vol. 8, Issue 2-3, pp. 249-265, 2003.

Artho et al., "Combining Test Case Generation and Runtime Verification", Theoretical Computer Science—Abstract state machines and high-level system design and analysis archive, vol. 336 Issue 2-3, pp. 209-234, May 2005.

Sacha Krzysztof, "Verification and Implementation of Dependable Controllers", International Journal of Critical Computer-Based Systems archive, vol. 1, Issue 1/2/3, pp. 238-254, Feb. 2010.

* cited by examiner

DYNAMIC GENERATION OF TEST SEGMENTS

CROSS-REFERENCE TO RELATED APPLICATIONS

This application is a continuation of and claims the benefit of U.S. non-provisional application Ser. No. 12/626,901 filed Nov. 29, 2009, now U.S. Pat. No. 8,438,000, which is hereby incorporated by reference in its entirety.

BACKGROUND

The present disclosure relates to verification of computerized systems, in general, and to generating tests based on test templates in particular.

Computerized devices control almost every aspect of our life—from writing documents to controlling traffic lights. However, computerized devices are bug-prone, and thus require a testing phase in which the bugs should be discovered. The testing phase, also referred to as verification phase, is considered one of the most difficult tasks in designing a computerized device. The cost of a bug may be enormous, as its consequences may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a significant portion, such as 70%, of the development cycle to discover erroneous behaviors of the computerized device.

A test template, comprising several template instructions, may be designed in order to test an aspect of a target computerized system. The test template may be utilized by a generator that generates several tests that are in line with the test template. The test may be implemented, for example, as a binary file or as an assembly program that is configured to perform actions defined in the test template.

A generator may iterate over template instructions in the test template, in a predetermined order. For each template instruction, the generator may generate a corresponding one or more test instructions.

BRIEF SUMMARY OF THE INVENTION

One exemplary embodiment of the disclosed subject matter is a computerized apparatus comprising: a processor; an interface for obtaining a test template associated with a target computerized system, the test template comprises a template segment, the template segment comprising one or more instructions and one or more directives or control constructs related to the instructions; a test generator configured to generate a test associated with the template segment obtained by said interface, said test generator comprises: a state simulator configured to determine a state of the target computerized system associated with an execution of the test; a template instruction or segment selector configured to select a template instruction or segment from the test template based on the state of the target computerized system determined by said state simulator; and an instruction template segment generator configured to generate a multiplicity of instructions based on the state of the target computerized system and the template segment selected by said template instruction selector, wherein the test generator further comprises an instruction verifier configured to verify that a previously generated instruction is in line with the current state of the target computerized system and with the template instruction or segment selected by said template instruction or segment selector.

Another exemplary embodiment of the disclosed subject matter is a method comprising: obtaining, by an interface, a test template associated with a target computerized system, the test template comprises a template segment, the template segment comprising one or more instructions and one or more directives or control constructs related to the instructions; generating a test associated with the template segment obtained by said interface, said test generator comprises: simulating a state of the target computerized system associated with an execution of the test; selecting a template instruction or segment from the test template based on the state of the target computerized system determined by said simulating; generating a multiplicity of instructions based on the state of the target computerized system and the template segment selected by said selecting; and verifying that a previously generated instruction is in line with the current state of the target computerized system and with the template instruction or segment selected by said selecting, whereby the test template is transformed to the test configured to be executed by the target computerized system.

Yet another exemplary embodiment of the disclosed subject matter is a computer program product comprising: a computer readable medium; a first program instruction for obtaining a test template associated with a target computerized system, the test template comprises a template segment, the template segment comprising one or more instructions and one or more directives or control constructs related to the instructions; and a second program instruction for generating a test associated with the template segment obtained by said interface, said second program instruction comprising: a third program instruction for simulating a state of the target computerized system associated with an execution of the test; a fourth fifth program instruction for selecting a template instruction or segment from the test template based on the state of the target computerized system determined by said simulating; a fifth program instruction for generating a multiplicity of instructions based on the state of the target computerized system and the template segment selected by said selecting; and a sixth program instruction for verifying that a previously generated instruction is in line with the current state of the target computerized system and with the template instruction or segment selected by said selecting, whereby the test template is transformed to the test configured to be executed by the target computerized system, and wherein said first, second, third, fourth, fifth and sixth program instructions are stored on said computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to generate a test based on a test template. Another technical problem dealt with by the disclosed subject matter is to utilize a simulated state of a target computerized system during generation, such that the test is directed to inspect some behaviors of the target computerized system, for example behaviors that may cause a bug, behaviors that include a predetermined scenario, such as involving exceptional parameters, behaviors that test various memory manipulations, or the like.

Yet another technical problem dealt with by the disclosed subject matter is to allow for a layout generation of a test template. A layout generation may enable the designer of the test template to rely on a layout of the test template as a layout of the test. Layout generation may be useful for tests that comprise repetitive behaviors, such as a loop. Yet another technical problem dealt with by the disclosed subject matter is to generate an instruction that is valid in respect to two or more different states of the target computerized system.

Yet another technical problem dealt with by the disclosed subject matter is the need to test more complex scenarios, such as a multiplicity of instructions that may be repeated, scenarios that comprise more complex programmatic constructs, whether known constructs for example if-then-else, while loops, or other user-defined constructs as required.

One technical solution is a test generator comprising a state simulator utilized for simulating a state of a target computerized system executing a generated test, and a template instruction selector for selecting a template instruction upon which an instruction is generated.

Another technical solution is to iterate over the template instruction in respect to the simulated state and to generate instructions in that order. Yet another technical solution is to determine whether an already generated template instruction is encountered and to verify that the corresponding generated instruction is an instruction that may have been generated by the test generator in respect to a current simulated state.

Another technical solution is to associate a location in memory with a template segment that may comprise of plurality of instructions, control constructs, and directives. The template segment may thus behave similarly to a macro, and the instructions will be generated every time the program gets to the location.

One technical effect of utilizing the disclosed subject matter is automatically generating a test based on a test template. Another technical effect is automatically generating a test that utilized an expected state of a target computerized system such that the generated instructions are configured to be associated with some aspects of the target computerized system. Yet another technical effect is modifying a gap of instructions in a test.

Another technical effect of utilizing the disclosed subject matter is relates to enhanced testing capabilities when testing complex programmatic constructs. Associating a location in memory with a template segment may provide a user designing the tests with control over the programmatic construct in every pass, which enables the testing of different behaviors on different passes.

Figure 1:
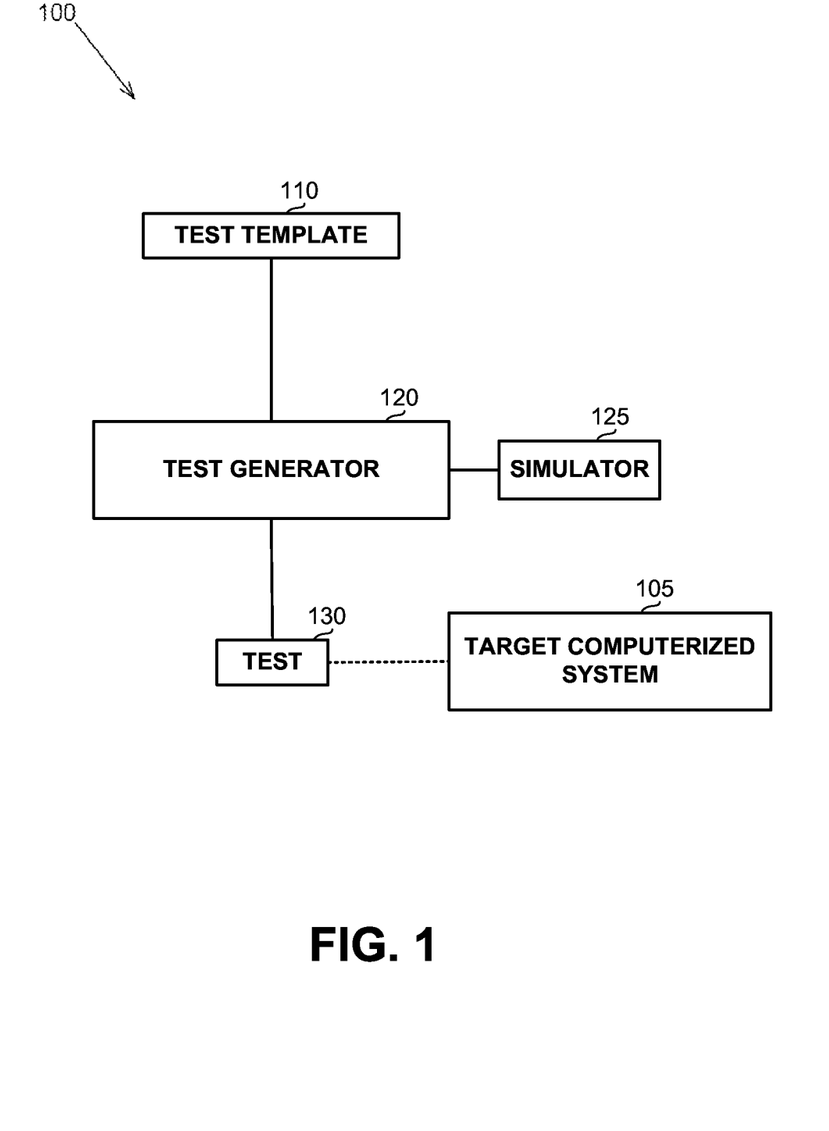
FIG. 1 shows a computerized verification environment in which the disclosed subject matter is used, in accordance with some exemplary embodiments of the subject matter.

Referring now to FIG. 1, showing a computerized verification environment in which the disclosed subject matter is used, in accordance with some exemplary embodiments of the subject matter. A computerized verification environment 100 may comprise a test template 110, a test generator 120 and a simulator 125.

Test template 110 may be a set of definitions that are configured to determine a test associated with a target computerized system 105. Test template 110 may be a layout test template. Test template 110 may comprise a set of template instructions. A template instruction (not shown) may define a set of one or more possible instructions, such as different types of instructions, accessing different resources (such as different memory addresses), having different parameters and the like. A template instruction may be for example "random instruction", which may define any valid instruction. A template instruction may be "ADD R3 R1+R2" which may define an addition instruction that adds values of registers. A template instruction may be "LOAD R4 MEM[R3+ displacement]" which may define a loading of memory to R4 register from a memory location defined by some random displacement from the value of register R3. It will be noted that some of the instructions defined by a template instruction may differ in number of bits, for example a LOAD operation may be defined to load 8 bits or alternatively 16 bits. A template instruction may be "conditional branch" which may define any conditional branching instruction. The template instruction may or may not be provided with a target address or label.

In some exemplary embodiments, test template 110 may comprise one or more segments which may be labeled, for example "if-then-else", "sorting macro", "John's segment" or the like, and which may comprise one or more instructions or one or more complex control constructs. When the test segment is first generated, the relevant instructions are generated in accordance with the template segment and a mapping is made between the memory location of the first instruction in the segment and the segment label. When execution arrives to the same memory location, the relevant instructions are generated again in accordance with the template segment and the current machine state, thus providing for testing more complex scenarios.

In some exemplary embodiments, the target computerized system may be a Processor, a Central Processing Unit (CPU), a microprocessor, an electronic circuit, an Integrated Circuit (IC), a mobile phone, a cellular device, a Personal Digital Assistant (PDA), hardware, software, firmware or the like.

In some exemplary embodiments, test generator 120 may generate a test 130 based on test template 110. Test generator 120 may generate a test 130 that is configured to inspect some aspects of target computerized system 105, for example invoking page fault behavior, initiating specialized behaviors in a cache, triggering optimization logic in an instruction scheduling or the like. It will be noted that the some aspects of target computerized system 105 may be exceptional or deemed interesting by a developer, verification engineer or the like. The some aspects of target computerized system 105 may be behaviors that are likely to involve an error.

In some exemplary embodiments, test generator 120 may comprise a simulator 125. Simulator 125 may simulate a state of target computerized system 105. Simulator 125 may simulate an execution of test 130, or a portion of test 130, by target computerized system 105. Test generator 120 may utilize simulator 125 to determine a state of target computerized system 105 after executing a generated portion of test 130. The state of target computerized system 105 may be utilized in generating additional portion of test 130, such as a "next" instruction about to be executed by target computerized system 105 according to the state determined by simulator 125.

In some exemplary embodiments, test generator 120 may iteratively generate an instruction in respect to a single template instruction, determines a state of target computerized system 105 executing the generated instruction, an continues generation of a next template instruction, according to the state of target computerized system 105.

In some exemplary embodiments, test generator 120 may further execute test 130 on target computerized system 105. Test generator 120 may execute test 130 after completing generation of test 130. In some exemplary embodiments, several tests are generated and may be executed on target computerized system 105.

Figure 2:
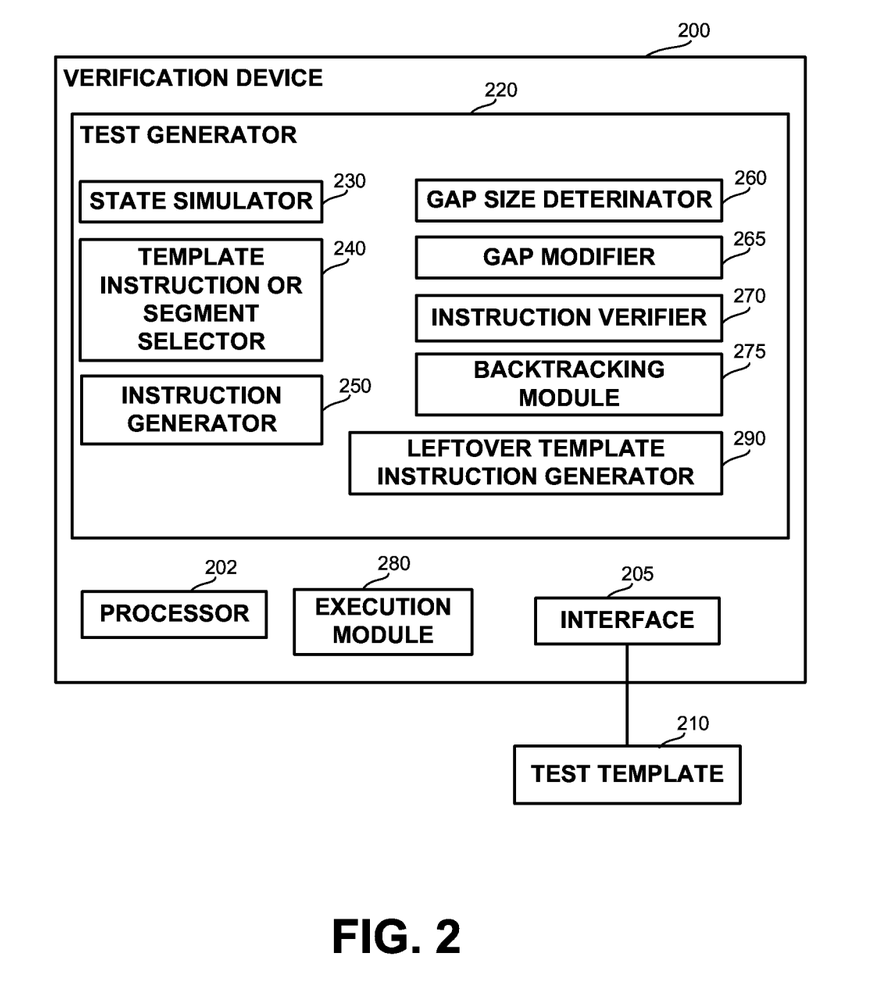
FIG. 2 shows a block diagram of a verification device in accordance with some exemplary embodiments of the disclosed subject matter.

Referring now to FIG. 2 showing a block diagram of a verification device in accordance with some exemplary embodiments of the disclosed subject matter. A verification device 200 may comprise a test generator 220, such as 120 of FIG. 1, which may comprise a state simulator 230, such as simulator 125 of FIG. 1.

Verification device 200 may further comprise an interface 205. Interface 205 may be configured to receive, retrieve or otherwise obtain a test template 210, such as test template 110 of FIG. 1. Interface 205 may be an Application Programming Interface (API), a socket or other I/O capable module.

In some exemplary embodiments, verification device 200 comprises a processor 202. Processor 202 may be a Central Processing Unit (CPU), a microprocessor, an electronic circuit, an Integrated Circuit (IC) or the like. Processor 202 may be utilized to perform computations required by verification device 200 or any of it subcomponents.

For example, test template 210 may comprised the following template instructions:

```
1: Generate {COMPARE}
2: Generate {CONDITIONAL BRANCH} with {target = ELSE}
3: Repeat {times in [1, 10]}
     Generate {random instruction}
4: Generate {BRANCH} with {target = END}
5: ELSE:
     Repeat {times=5}
        Generate {random instruction} with {exception}
```

A first template instruction may indicate generating of a compare instruction. A second template instruction may indicate generating a conditional branch instruction, which is targeted to an ELSE label. In some exemplary embodiments, the target may be an explicit address, an implicit address, a label or the like. A third template instruction may indicate generation of any number of instructions between one and ten, each instruction may be any possible instruction. A fourth template instruction may indicate generation of a branching instruction which is targeted to an END label. A fifth template instruction may indicate generation of five instructions, each of which may be any instruction that causes an exception. The fifth template instruction may further indicate that the ELSE label is associated with a first instruction generated based on the fifth template instruction. It may be noted that the END label may be similarly defined in an additional template instruction, such as a sixth template instruction.

In some embodiments, test template 210 may comprise one or more instruction segments, which may be treated similarly to a macro, e.g., a sequence of corresponding computer instructions may be generated every time the macro location is reached. The test template may comprise one or more instructions and one or more directives related to the instructions. The directives may influence the behavior of the generated code, such that the instructions generated upon the template segment may behave differently in different activations of the generator, due to the directives.

For example, test template 210 may comprise the following template segment:

```
Macro If-Then-else-Loop:
START:
   Generate {COMPARE}
   Generate {CONDITIONAL_BRANCH} with {target=ELSE}
   If (the conditional branch was not taken) {
      Repeat {times=2}
         Generate {random instruction}
         Generate {BRANCH} with {target=END}
   }
   Else { //the branch was taken
   ELSE:
      Repeat {times=3}
         Generate {random instruction} with {exception}
   }
   END:
   Generate {COMPARE }
   Generate {CONDITIONAL_BRANCH } with { target=START }
```

Since the usage of variables may be allowed to adjust the variables according to the generated instructions, all labels are assumed to be known when encountered. For simplicity, it may be assumed that the If-Then-Else macro is generated at address 0x1000 and instructions are 4 bytes length. In such case the ELSE will reside at 0x1014 (or at CONDITIONAL_ BRANCH address+0x14), and the END will reside at 0x1024 and a possible memory image after the first pass may be:

0x1000 cmp
0x1004 cond_branch
0x1008 XXXXXXXX
0x100c XXXXXXXX

0x1010 XXXXXXXX
0x1014 add
0x1018 sub
0x101c xor
0x1020 cmp
0x1024 cond_branch

Wherein the XXXXXXXX represents that no instructions were generated in these addresses.

If the last conditional branch is taken and execution goes back to the START label, then the generator arrive again to address 0x1000. Since the tool binds this address to the If-Then-else-Loop macro, this macro is now generated again in the current state of the machine, wherein the full expressive power of the description language of the generator may be used. If on the second pass the first conditional branch is not taken, then a possible image of the memory after the second pass may be as follows:

0x1000 cmp
0x1004 cond_branch
0x1008 mult
0x100c div
0x1010 branch
0x1014 add
0x1018 sub
0x101c xor
0x1020 cmp
0x1024 cond_branch Every time generation reaches address 0x1000 the macro may be called and the generator will generate corresponding commands. Although the memory may already be occupied when execution reaches that point, some changes may still occur during later passes of the generation, for example by specifying directives in the template segment which may be indicated, for example, as parameters related to an instruction or a segment, or in any other manner. For example, a verification engineer may specify that no exceptions are allowed up to the $10^{th}$ pass, but are allowed in later passes. In other examples, the directives may relate to what data is stored/loaded, whether to choose a result that will raise a flag or not, or the like. Thus, in different generations different directives may be used which test different aspects of the scenarios and the rules specified in the macro may be enforced.

In another example, the macro may be used for testing self-modifying code as follows:

LOOP:
  Generate First Time sub, Second time add, Third time xor
    // in the first pass generate a subtract command, in the second time an add command and in the third time a xor command
  Repeat {times=between [1,5]}
    Generate {random instruction}
  Generate move (memory to memory instruction that will move 4 bytes to LOOP from a new memory, assuming add, sub and xor are all 4 bytes long)
  Cond_branch (3 times to Loop)

In the first time the sequence is generated, a SUB instruction may be generated. Then some instructions may be generated, and then a Move instruction may be generated which moves from a new location in memory back to the Loop label, after which the branch back to LOOP may be taken. Using late initialization, any required instruction may be generated, for example an add instruction may be generated in the right time and context, and similarly for the third pass of the loop.

In some embodiments, random decisions may be taken during the generation of the template section since a language may support random decisions in the control constructs, for example how many times a Repeat statement will occur. The decision is recorded, and in the next time the location is reached, the decision which originally was random is now enforced to the previous value. This may provide a user with flexibility to have the first pass very random since later passes may take random decisions into account.

Test generator 220 may be configured to generate a test based on test template 210. Test generator 220 may be configured to generate a test based on a layout test template. Test generator 220 may be configured to provide for a dynamic test generation, taking into account an expected state of the target computerized system executing the test, in order to generate the test such that some aspects of the target computerized system may be inspected.

In some exemplary embodiments, state simulator 230 may be configured to simulate an execution of a test. State simulator 230 may be implemented in hardware, software, firmware, combination thereof or the like. State simulator 230 may determine a state of the target computerized system executing one or more instructions. For example, the state may include values to various variables, such as for example registers, program counter and the like, content of memory space, memory addresses, content of caching system and the like. A value of a program counter, instruction pointer or a similar next instruction indicator variable may indicate a next instruction to be performed by the target computerized system in a next cycle. State simulator 230 may be configured to be suspended after execution of one or more instructions. State simulator 230 may further execute one or more additional instructions after being deemed as no longer suspended. State simulator 230 may be configured to initially simulate an initial state of the target computerized system upon booting, loading a test or the like.

In some exemplary embodiments, test generator 220 may comprise a template instruction or segment selector 240. Template instruction or segment selector 240 may be configured to select a template instruction or a template segment from test template 210 in accordance with the state of the target computerized system. The state of the target computerized system may be determined by simulator 230. The template instruction may be selected based on a value of a next instruction indicator such as for example a program counter, an instruction pointer or the like. The next instruction indicator may indicate which instruction is deemed to be executed next by the target computerized system. Referring to the aforementioned exemplary test template, after executing an instruction associated with the second template instruction, the next instruction indicator may point to a successive instruction associated with the third template instruction, or to a different instruction associated with the fifth template instruction (i.e., associated with the ELSE label). The value of the next instruction indicator may depend on a value evaluated after executing an instruction associated with the first template instruction. The value of the next instruction indicator may depend on determination whether or not the conditional branch is taken, which may be based on an output of a comparison instruction, generated based on the first template instruction. Template instruction or segment selector 240 may determine a template instruction or template segment that is associated with an instruction that is deemed to be executed next by the next instruction indicator. Template instruction or segment selector 240 may select, for example, the third template instruction the fifth template instruction, or a template segment.

In some exemplary embodiments, template instruction or segment selector 240 may select to execute a template segment rather than a template instruction, such as a segment identified by a label, such as the macros provided above.

Template instruction or segment selector 240 may thus be configured to select a template instruction or a template segment from test template 210 in accordance with the state of the target computerized system. The state of the target computerized system may be determined by simulator 230. The template instruction or segment may be selected based on a value of a next instruction indicator such as for example a program counter, an instruction pointer or the like. The next instruction indicator may indicate which instruction or segment is deemed to be executed next by the target computerized system.

In some exemplary embodiments, test generator 220 may comprise an instruction generator 250. Instruction generator 250 may generate one or more instructions based on a template instruction. Instruction generator 250 may utilize a state of the target computerized system to generate the one or more instructions. The state may be determined by state simulator 230. Instruction generator 250 may generate an instruction that is configured to test some aspects of the target computerized system, such as causing page faults, division by zero, raising exceptions and the like. Instruction generator 250 may utilize the state of the target computerized system to determine which instruction to generate, which parameters to provide the instruction or the like. In some exemplary embodiments, the state of the target computerized system prohibits a generation of an invalid instruction, such as accessing an invalid section of the memory space, or instructions that may be illegal instruction in a mode of the computerized system, such as an expected mode of the computerized system while executing the test or the like. Instruction generator 250 may generate a test comprising the instructions.

In some exemplary embodiments, test generator 220 may comprise a template segment generator 255, for generating a multiplicity of instructions based on a template segment, such as the segments shown above. Template segment generator 255 may utilize a state of the target computerized system to generate the instructions. The state may be determined by state simulator 230. Template segment generator 255 may generate instructions based on a template segment, the instructions configured to test some aspects of the target computerized system, such as causing page faults, division by zero, raising exceptions and the like, as demonstrated in the scenario depicted in the template segment. Template segment generator 255 may utilize the state of the target computerized system to determine which instructions to generate, and with which directives. Thus, the instructions generated upon the template segment may behave differently in different generations due to the variations in the directives.

In some exemplary embodiments, test generator 220 may comprise a gap size determinator 260. Gap size determinator 260 may be configured to determine a number of instructions between two template instructions. For example, gap size determinator 260 may determine that there may be five instructions between the second test template and the fifth test template. It will be noted that gap size determinator 260 may determine a number of instructions that is an approximation of the correct number of instructions. Gap size determinator 260 may determine a number of instructions based on an exemplary generation of instructions based on the template instructions between the two template instructions. Gap size determinator 260 may be utilized in case a template instruction or segment selector 240 determines a next template instruction is not a consecutive template instruction, such as in case of branch instruction being taken. The determination of gap size determinator 260 may be utilized by instruction generator 250 to determine a location within the test to add an instruction which instruction generator 250 generates. For example, in case the gap is of five instructions, instruction generator 250 may leave space for five instructions between an instruction associated with a first of the two template instructions and an instruction associated with the second of the two template instructions. It will be noted that a portion of the space may already be occupied by instructions previously generated by instruction generator 250. It will be noted that in a test a location of an instruction may be important as the location may be associated with an address which may be utilized in some instructions.

In some exemplary embodiments, test generator 220 may comprise a gap modifier 265. Gap modifier 265 may be configured to modify a gap of space for instructions left. Gap modifier 265 may extend the gap or shrink the gap, as required.

The gap may be modified to include additional space by adding a branching instruction to a designated memory space or region in which additional instructions may be added. A last instruction in the designated memory space may be a branching instruction to a location in the gap, immediately after the gap or the like. For example, a space of five instructions may be utilized to effectively occupy ten instructions by, for example, using the space for four instructions and a branching instruction to the designated memory space; using the designated space for the rest of the instructions (six instructions) and for a branching instruction to an address immediately after the gap. It will be noted that the designated memory space may be a memory space which may be reserved to extending a gap. The designated memory space may partitioned to comprise several such extensions to different gaps.

The gap may be modified to include less space (also referred to as shrinking the gap), by utilizing a branching instruction inside the gap, by adding empty instructions or the like. Empty instructions, such as a "no op" instruction may be configured to be avoided by the target computerized system such that they do not alter the state of the target computerized system except for the next instruction indicator. In some exemplary embodiments, a preprocessing step may be performed to eliminate the "no op" instructions. The gap may be shrunk by utilizing a branching instruction from a first instruction to a second instruction, such that the instructions between the first and second instructions may not be executed.

In some exemplary embodiments, test generator 220 may comprise an instruction verifier 270. Instruction verifier 270 may verify that a generated instruction is in line with a state of the target computerized system. The generated instruction may be previously generated by instruction generator 250. The generated instruction may be associated with a template instruction. The template instruction may be selected by template instruction or segment selector 240 based on the state of the target computerized system. In some exemplary embodiments, as the generated instruction is already generated, there is no need that instruction generator 250 generates any instruction associated with the template instruction. Instruction verifier 270 may verify that that generated instruction is a valid instruction in respect to the current state of the target computerized system, as may be determined by state simulator 230. For example, the generated instruction may be valid in a first mode of the target computerized system and invalid in a second mode of the target computerized system. The generated instruction may be generated in respect to a previous state of the target computerized system, in which the target computerized system is in the first mode. Instruction verifier 270 may determine that the generated instruction is invalid in case the target computerized system is in the second mode in the current state. In some exemplary embodiments, test generator 220 may revoke the generated instruction. In some exemplary embodiments, test generator 220 may generate additional instruction that may be configured to handle the generated instruction in the second mode, such as for example by handling an exception that may be raised.

In some exemplary embodiments, test generator 220 may comprise a backtracking module 275 configured to revoke one or more instructions. Backtracking module 275 may revoke the one or more instructions based on a determination by instruction verifier 270 that a generated instruction is not a valid instruction. Backtracking module 275 may be utilized in case instruction generator 250 determines that no valid instruction may be generated, such as for example, in case of a parameter determined by the template instruction that has a value that prevents any generated instruction to be valid. For example, a template instruction defining a branching operation to an address stored in a register may not be valid in case the content of the register is not a valid address. Backtracking module 275 may revoke one or more instructions previously generated by instruction generator 250 in order to backtrack to a state in which a different generation may heal the cause that required the backtracking, such as an invalid instruction that was previously generated. The backtracking may achieve this goal by, for example, generating a different instruction instead of the generated instruction or replacing other instructions such that the state of the target computerized system may be modified. Referring again to the template instruction defining a branching operation to an address stored in a register, a content of the register may be modified by modifying instructions that affected the value of the register.

In some exemplary embodiments, test generator 220 may comprise a leftover template instruction generator 290. Template instruction generator 290 may be configured to generate instructions associated with one or more template instructions in test template 210 which are designated, based on the state of the target computerized system, not to be executed. For example, referring back to the aforementioned exemplary test template, in case a branching instruction associated with the second template instruction is determined to cause a jump to the ELSE label, the third and fourth template instructions may not be generated. In such a case, a gap may be left, as determined by gap size determinator 260. After it is determined that an execution of a test generated in respect to test template 210 is completed, for example by state simulator 230, the leftover template instruction generator 290 may determine whether a portion of test template 210 was not utilized in the generation process, and is therefore deemed as leftover template instruction. Leftover template instruction generator 290 may generate instructions associated with the leftover template instruction. Leftover template instruction generator 290 may generate instructions in a similar manner to instruction generator 250. Leftover template instruction generator 290 may generate instructions based on the test template such that the generated instructions are in line with the test template. In some exemplary embodiments, leftover template instruction generator 290 may generate invalid instructions that may or may not be in line with the leftover template instructions. The invalid instructions may be useful to increase quality of the test. For example, in some cases, a target computerized system may tentatively perform instructions before verifying that they should be performed. Once a determination is made that the instructions should not be executed, the outcome of its tentative execution is omitted. In case there is a bug in the target computerized system an invalid instruction may be erroneously performed, enabling personnel verification engineer to detect the bug during verification.

In some exemplary embodiments, verification device 200 may comprise an execution module 280. Execution module 280 may be utilized to execute the test on the target computerized system. Execution module 280 may be configured to execute the test once generation of the test by test generator 220 is completed.

Figure 3:
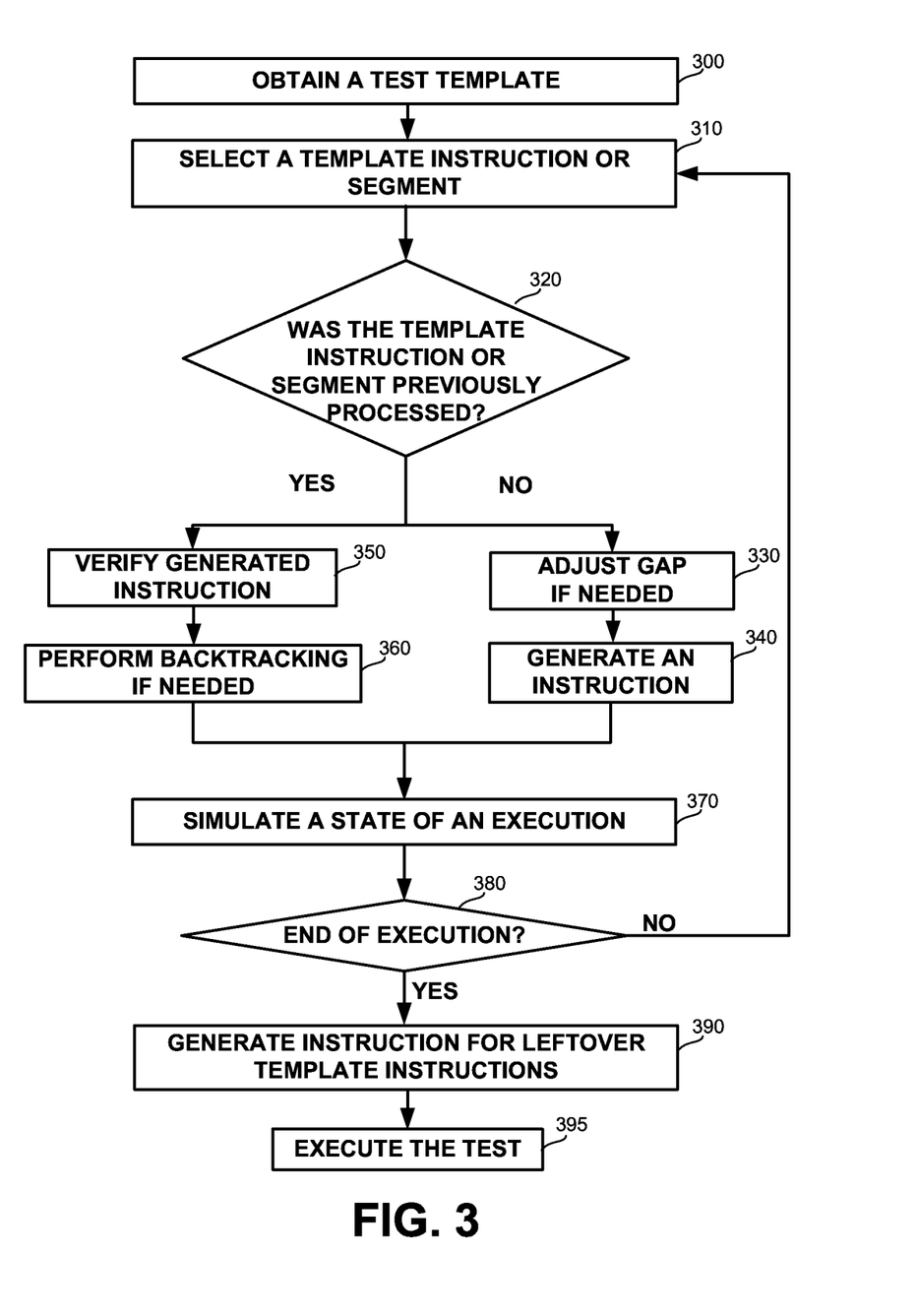
FIG. 3 shows a flowchart diagram of a method in accordance with some exemplary embodiments of the disclosed subject matter.

Referring now to FIG. 3 showing a flowchart diagram of a method in accordance with some exemplary embodiments of the disclosed subject matter.

In step 300, a test template, such as 210 of FIG. 2, may be obtained. The test template may be obtained by an interface, such as 205 of FIG. 2.

In step 310, a template instruction or a template segment may be selected from the test template. The template instruction or segment may be selected by a template instruction or segment selector, such as 240 of FIG. 2.

In step 320, a determination is made whether the template instruction or segment was previously processed or not. In case the template instruction or segment was not already processed, step 330 may be performed. In case the template instruction or segment was previously processed, and one or more instructions were generated in respect to the test template, step 350 may be performed.

In step 330, a gap between a first template instruction and a second template instruction may be adjusted. The first template instruction may be a template instruction or segment selected in step 310 in a preceding iteration of the exemplary method. The second template instruction may be the template instruction or segment selected in step 310 in the current iteration. A size of a gap may be determined by a gap size determinator, such as 260 of FIG. 2. A gap may be extended or shrunk by a gap modifier, such as 265 of FIG. 2. A size of gap may be determined in case of a branching operation or a similar jumping instruction to a non-sequential template instruction. A gap may be modified in case of a former gap that was left and is being utilized for generation of instruction associated with the current template instruction.

In step 340, an at least one instruction associated with the template instruction, or a multiplicity of instructions associated with a template segment may be generated. The instruction or instructions may be generated based on state of a target computerized system executing the test. The instruction or instructions may be generated by an instruction generator, such as 250 of FIG. 2.

In step 350, a generated instruction or instructions may be verified in respect to a current state of the target computerized system. The generated instruction or instructions may be verified by an instruction verifier, such as 270 of FIG. 2.

In step 360, backtracking may be performed in case needed. The backtracking may be performed by a backtracking module, such as 275 of FIG. 2. The backtracking may revoke one or more generated instructions, modify the state to a state before the execution of the revoked one or more generated instructions.

In step 370, which may be performed after step 340 or step 360, a state of a target computerized system executing the test is simulated. The state may be simulated incrementally, by starting with a state before execution of the instruction associated with the template instruction or segment selected in step 310, and modifying the state by executing the instruction associated with the template instruction. The state may be simulated by a state simulator, such as 230 of FIG. 2. It will be noted that the state of the target computerized system may initially be set to an initial state, associated with a boot of the target computerized system, loading of a test or the like.

In step 380 a determination is made whether the execution of the test was completed. The determination may be based on the state of the target computerized system. The determination may be based on the test template and whether additional template instructions exist.

In step 390, leftover template instructions may be identified. In some exemplary embodiments, generation of instructions associated with the leftover template instructions may be performed. Step 390 may be performed by a leftover template instruction generator, such as 290 of FIG. 2.

In step 395, the test, as generated by the method, may be executed by the target computerized system. The test may be executed by an execution module, such as 280 of FIG. 2.

In some exemplary embodiments, generation of instructions may be affected by the type of instruction or instruction combination comprising a template segment. A template instruction which includes a non-branching instruction may be processed by generating associated instruction and simulating the execution of the associated instruction. A template instruction which includes a label definition may be processed by further associating the next instruction indicator with the label. Such a label may be referred to as a defined label. A template instruction which includes a branching instruction to a defined label, may be processed by generating a branch instruction to the address associated with the defined label and by executing the branch instruction. The next template instruction to be processed may be either the branch target or the next instruction addresses, depending on the outcome of the execution of the branch. A template instruction which includes a branch to an undefined label may be processed by associating each template instruction between the template instruction and a label definition of the undefined label with a memory location, such that the label may be defined. After aforementioned association of template instructions and memory locations, the template instruction may be further processed as a template instruction including a branching instruction of a defined label.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus comprising:
   a processor;
   an interface for obtaining a test template associated with a target computerized system, the test template comprises a template segment, the template segment comprising at least one instruction and at least one directive or control construct related to the at least one instruction;
   a test generator configured to generate a test associated with the template segment obtained by said interface, said test generator comprises:
   a state simulator configured to determine a state of the target computerized system associated with an execution of the test;
   a template instruction or segment selector configured to select a template instruction or segment from the test template based on the state of the target computerized system determined by said state simulator; and
   an instruction template segment generator configured to generate a multiplicity of instructions based on the state of the target computerized system and the template segment selected by said template instruction or segment selector, wherein the multiplicity of instructions behave differently in different activations of the instruction template segment generator due to the at least one directive or control construct,
   wherein the test generator further comprises an instruction verifier configured to verify that a previously generated instruction is in line with the current state of the target computerized system and with the template instruction or segment selected by said template instruction or segment selector.

2. The computerized apparatus of claim 1, wherein said test generator further comprises a gap size determinator configured to approximate a number of instructions between two template instructions.

3. The computerized apparatus of claim 2, wherein said test generator further comprises a gap modifier configured to modify a gap determined by said gap size determinator.

4. The computerized apparatus of claim 1, wherein the generated instruction is generated by said instruction generator in respect to a second state of the target computerized system.

5. The computerized apparatus of claim 1, wherein said test generator comprises a backtracking module configured to revoke at least the generated instruction.

6. The computerized apparatus of claim 1 further comprising an execution module configured to execute the test generated by said test generator.

7. The computerized apparatus of claim 1, wherein said test generator further comprising a leftover template instruction generator.

8. The computerized apparatus of claim 1, wherein said instruction template segment generator, generate different template instruction when the said instruction verifier determines that such instruction could be generated.

9. A computerized apparatus comprising:
   a processor;
   an interface for obtaining a test template associated with a target computerized system, the test template comprises a template segment, the template segment comprising at least one instruction and at least one directive or control construct related to the at least one instruction;
   a test generator configured to generate a test associated with the template segment obtained by said interface, said test generator comprises:
   a state simulator configured to determine a state of the target computerized system associated with an execution of the test;
   a template instruction or segment selector configured to select a template instruction or segment from the test template based on the state of the target computerized system determined by said state simulator; and
   an instruction template segment generator configured to generate a multiplicity of instructions based on the state of the target computerized system and the template segment selected by said template instruction or segment selector, wherein said instruction template segment generator, records random choice made during generation in the state of the target computerized system and utilizes this during the generation in a second state of the target computerized system; and
   wherein the test generator further comprises an instruction verifier configured to verify that a previously generated instruction is in line with the current state of the target computerized system and with the template instruction or segment selected by said template instruction or segment selector.

10. A method in a computerized environment, said method comprising:
    obtaining, by an interface, a test template associated with a target computerized system, the test template comprises a template segment, the template segment comprising at least one instruction and at least one directive or control construct related to the at least one instruction, wherein the at least one instruction behaves differently in different generated tests due to the at least one directive or control construct;
    generating a test associated with the template segment obtained by said interface, said generating comprises:
    simulating a state of the target computerized system associated with an execution of the test;
    selecting a template instruction or segment from the test template based on the state of the target computerized system determined by said simulating;
    generating a multiplicity of instructions based on the state of the target computerized system and the template segment selected by said selecting; and
    verifying that a previously generated instruction is in line with the current state of the target computerized system and with the template instruction or segment selected by said selecting,
    whereby the test template is transformed to the test configured to be executed by the target computerized system.

11. The method of claim 10, wherein said simulating the state of the target computerized system, said selecting a template instruction or segment and said generating the multiplicity of instructions are performed several times, a first template instruction or segment is selected in a first iteration of said selecting a template instruction or segment, a second template instruction is selected in a second iteration of said selecting a template instruction or segment; and wherein generating the test further comprises approximating a number of instructions between the first template instruction or segment and the second template instruction or segment.

12. The method of claim 10, wherein said generating the test further comprises modifying a gap comprising adding a jumping instruction to a target address, the target address is in a memory location selected from the group consisting of a designated memory region and a memory location associated with an end of the gap.

13. The method of claim 10, wherein said generating the test further comprises revoking at least the generated instruction or segment.

14. The computerized method of claim 10 further comprising executing the test on the target computerized system.

15. The computerized method of claim 10 wherein said generating the test further comprises generating an instruction based on a leftover template instruction.

* * * * *